May 8, 1928.  
E. DUCHESNE  
1,669,233  
FLUID PRESSURE MOTOR  
Filed Dec. 2, 1924  
2 Sheets-Sheet 1
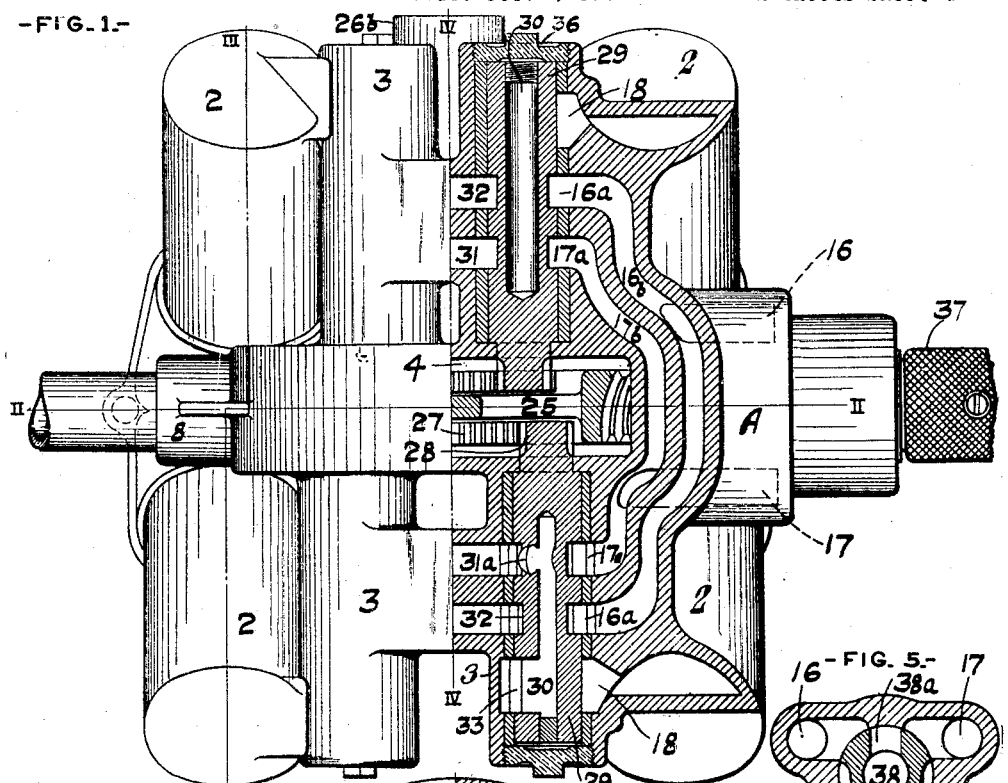
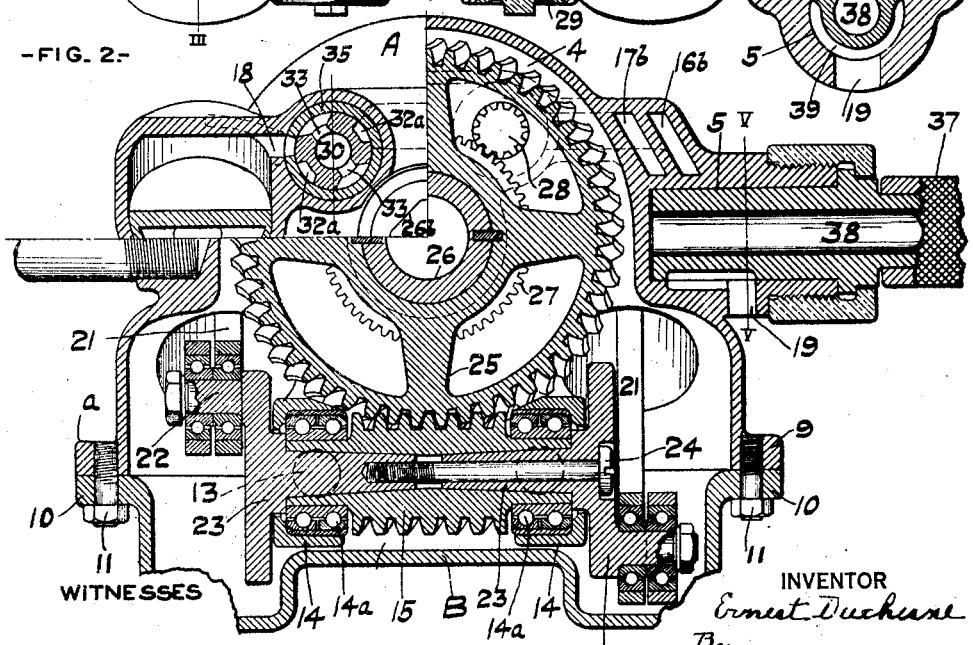
WITNESSES
INVENTOR  
Ernest Duchesne  
By  
Clarence L Kerr  
Attorney.

May 8, 1928.  1,669,233
E. DUCHESNE
FLUID PRESSURE MOTOR
Filed Dec. 2, 1924  2 Sheets-Sheet 2
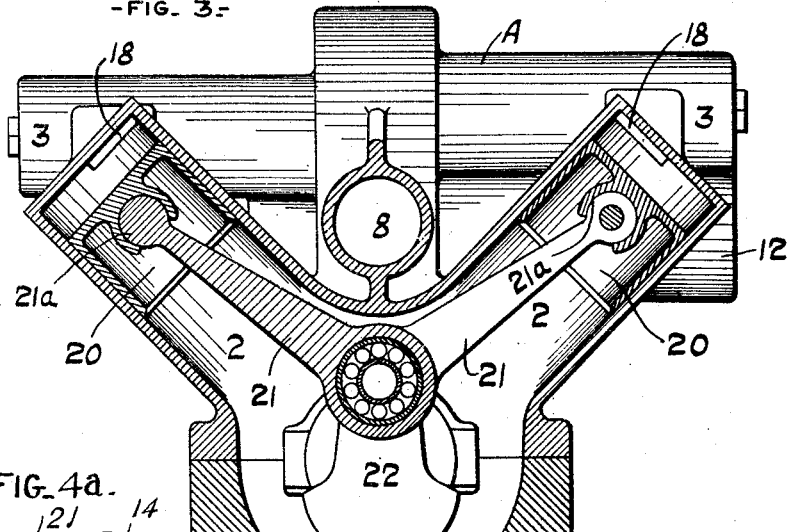
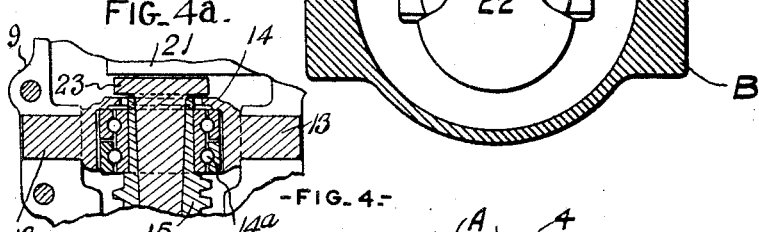
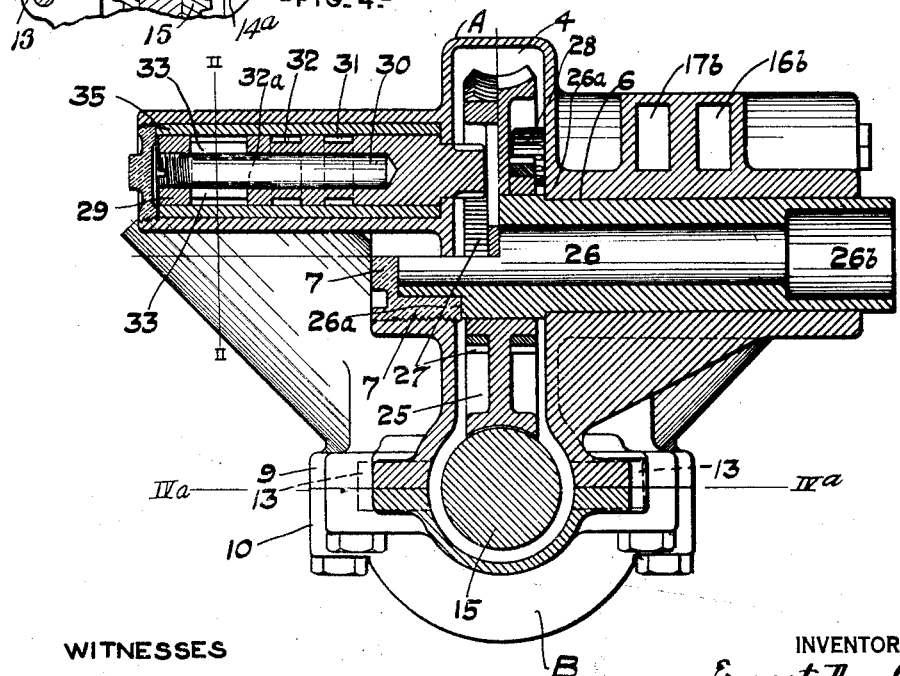
WITNESSES
INVENTOR
Ernest Duchesne,
By Clarence D. Kerr
Attorney.

Patented May 8, 1928.

1,669,233

UNITED STATES PATENT OFFICE.

ERNEST DUCHESNE, OF SCHENECTADY, NEW YORK.

FLUID-PRESSURE MOTOR.

Application filed December 2, 1924. Serial No. 753,426.

My invention relates to portable fluid pressure motors designed for drilling, tapping and similar operations usually performed with a portable tool, and is designed to provide a light weight, compact, and comparatively powerful mechanism, capable of doing work ordinarily done by machines of a much heavier character and which has great flexibility in speed. To this end, in my improved machine, the fluid pressure cylinder pistons are connected to a worm drive, by which a gear having the tool socket fixed thereto is driven. My invention also comprises an automatic valve control by the driven gear; the disposition of the cylinders relative to the worm; the connection between the pistons and the worm; the mounting of the worm in bearings between the parts of the motor housing; and various other features.

The improvement claimed is hereinafter fully set forth.

In the accompanying drawings: Figure 1 is a plan view, partly in section, of a device embodying the invention; Fig. 2, a vertical section, taken three quarters on the line II II of Fig. 1, and one quarter on the line II II of Fig. 4; Fig. 3, a vertical section, taken on the line III III of Fig. 1; Fig. 4, a vertical section taken on the line IV IV of Fig. 1; Fig. 4ª, a partial section, taken on the line IVª IVª of Fig. 4; and, Fig. 5, a section, taken on the line V V of Fig. 2.

In the practice of my invention, referring descriptively to the specific embodiment thereof, which is herein exemplified, A indicates the upper housing of the machine having preferably integral therewith, the cylinders 2 and valve chamber 3, of each of which I have shown four; a worm wheel chamber 4; a chamber or pocket 5, for the air control throttle; a spindle bearing 6; a seat for a spindle thrust plug 7; and an ordinary handle socket 8. The housing A also has flanges 9, apertured to register with the apertures in the flanges 10 of the lower housing B, and the two housings are secured together by the bolts 11, which extend through the apertures in the said flanges 9 and 10. The two flanges 9 and 10 are formed with semi-circular recesses for the supporting trunnions 13 (shown in dotted lines in Figs. 2 and 4), of the collars 14, which support the worm 15.

The housing A also contains air ports, 16 and 17, leading from the chamber or pocket 5, and ports 18, leading into each cylinder, from the valve chambers 3. An exhaust port, 19, leads outwardly from the chamber 5.

The pistons 20 are coupled to the connecting rods 21, by the usual ball joints 21ª. The cylinders 2 are disposed at such angles, one to the other, and to the axis of the worm 15, that one-piece connecting rods 21 may be employed. Two of these rods 21 are coupled to each crank 22 (there being two cranks) by a ball bearing joint, and the cranks 22 are assembled at 180° to each other. Each of the cranks 22 is formed integral with, or fixed to, one of a pair of shafts 23, upon the axis of which it rotates, and the shafts extend in line axially into a two-way tapered centeral aperture in the worm 15, and are rigidly held therein by a bolt 24. The worm 15 is supported, near its ends, in the ball bearing races 14ª, which in turn are supported by the collars 14, and the collars by their trunnions 13 in the housings A and B.

Engaging the worm 15, in a worm wheel 25, which is fixed on a rotating spindle 26, journalled in the housing A, and is held from lateral movement by the shoulders 26ª, which, on one side, engage the sides of the wheel chamber 4, and, on the other, the spindle thrust plug 7. The spindle 26 may be readily removed through the seat for the plug 7. In the outer end of the spindle 26, there is formed a tool socket 26ᵇ. On the periphery of the worm wheel hub, at each side of the wheel, there is secured a spur gear 27, each of which gears engages a pinion 28 on a valve 29 on that side of the worm wheel 25.

Each valve 29 has a central chamber 30, and exterior annular grooves 31 and 32, which are respectively in alignment with the port openings 17ª and 16ª, in the wall of the valve chamber 3, and thus ensure a continuous connection with the ports 17 and 16, through the air ducts 17ᵇ and 16ᵇ, respectively. The groove 31 is connected, by the port 31ª, with the hollow valve center 30. Connecting with the groove 32 are two grooves 32ª arranged 180° from each other on the valve, and extending longitudinally along the exterior thereof to a point opposite the cylinder port opening 18. The valve central chamber 30, has two ports 33, at an angle of 90° with the grooves 32ª, and extending to the periphery of the valve. Thus, each port, 16 and 17, is alternately opened to the port 18, for each revolution of the valve. The ratio between the worm 15 and the worm wheel 25, is twice that between the pinion 28 and the gear 27, and, consequently, each piston makes two complete strokes for each revolution of its valve 29. It is therefore necessary to have this double opening for each such revolution. Each valve 29, is fitted in a bushing 35, with apertures therein corresponding to the apertures in the chamber walls, and the bushing 35 is slightly longer than its valve 29, so that the valve caps 36 may be screwed tightly thereagainst, without interfering with the free rotary movement of the valves.

Through the central bore 38, of the control handle 37, which is intended to be connected to an air hose, live air is admitted through the opening 38$^a$ to either of the ports 16 or 17. As air is admitted to one or the other of the ports 16 or 17, a groove 39, in the handle 37, connects the opposite port with the exhaust port 19. Also, if it is desired to cut off air from the motor, this may be done by turning the opening 38$^a$ into alignment with the exhaust port 19, as shown in Fig. 5.

The operation of my improved motor is as follows:

When the air control handle 37 is turned to the right, as shown in Fig. 1, air flows from the hose connection through the hollow stem 38 and opening 38$^a$, into the port 16, and through the ducts 16$^b$ and openings 16$^a$, to the grooves 32 and 32$^a$, into the cylinder ports 18, and thereby actuates the pistons 20 therein. Exhaust air escapes from the cylinders 2, through the ports 18 and valve ports 33 to the center 30 of the valve, then out through the port 31$^a$, the groove 31, openings 17$^a$, channel 17$^b$ to the port 17 and thence through the groove 39 and discharge port 19 to the atmosphere.

As the valves 29 rotate at a speed which is one half the speed of the cranks 21, the valves function twice during a single revolution, and this is accomplished by having the ports 33 and grooves 32$^a$ located alternately and 90° apart on the periphery of the valve, so that as one of these ports or grooves closes off connection to the port 18, another begins to open up to such port. Hence, when a piston 20 is at the top of a cylinder 2, just ready to start on its downward working stroke, the port 32$^a$ will begin to open and admit live air to the cylinder. When the piston has reached the bottom of its stroke, port 32$^a$ will have passed by port 18 and is thus closed. Next in succession, port 33 will open up to port 18, and, as the piston begins its return stroke, the air in the cylinder 2 will flow out of the port 33 and escape to the atmosphere, as is described above.

While this cycle is taking place in one cylinder the companion cylinder which is operated from the same crank is going through an exactly similar cycle, but with the timing of the valve reversed, so that when a port 32$^a$ in one valve is admitting live air to its cylinder, the corresponding valve has its port 33 open to its corresponding cylinder, thus permitting the used air to escape. The other pair of cylinders, valves and pistons go through exactly the same cycle, except that their corresponding valves are timed to operate the cylinder pistons exactly one-half stroke behind (or ahead of) the first pair, as the two cranks are set in line oppositely or at an angle of 180° apart.

In reversing the machine, the control handle 37 is turned to the right (as shown in Fig. 5), reversing the direction of flow of air and the operation of the machine by making the port 17 the live air port and the port 16 the exhaust air port. Thus, if the piston in the right-hand cylinder shown in Fig. 3 had been travelling toward the top of the cylinder, thus exhausting the air therefrom, when the machine was stopped by the control throttle 37, the valve port 33 would still be slightly open to port 18. If now the throttle 37 were opened in the opposite direction, live air would flow through the port 33 into the cylinder, and thus force the piston down the cylinder, on a working stroke, in a direction opposite to that of its previous movement.

Such reverse movement would immediately be transmitted through the crank, worm, worm wheel, and valve pinion to the valve, so that the whole machine would thereupon function in a reverse direction.

Fluid pressure motors, constructed in accordance with my invention, are light and compact, develop a high capacity, and are of such a design that they may be readily and quickly assembled or dismantled.

The invention claimed as new and desired to be secured by Letters Patent is:

1. In a fluid pressure motor construction, a housing; a worm gear mounted in a centrally disposed position in said housing; a tool-holding spindle mounted in the housing for operation by said worm gear; a pair of cylinders supported by said housing at each side thereof and mounted in V-shaped relation to each other, pistons in said cylinders; a worm shaft mounted for intermeshing engagement with said worm gear and extending in connecting relation to the apex ends of the V-members formed by the cylinders, pistons in the cylinders having operating connections with the opposite ends of the worm shaft structure; a cover cap section for said housing; said cover cap section being adapted to be joined to the housing in a plane coincident with the axis of the worm shaft and parallel to the tool-holding spindle; and bearings for the worm shaft having oppositely extending trunnions, the joining edges of the housing and the cover cap section being provided with registering seating recesses in which the trunnions of the bearings are received, whereby the removal of the cover cap section provides for the removal of the worm shaft structure as a unit.

2. In a portable fluid pressure motor construction, a housing; a pair of cylinders mounted on each side of the housing, the members of each pair of cylinders being mounted in a V-shaped relation to each other; a tool-operating worm gear mounted in a centrally disposed position in the housing and extending transversely thereacross and into the angles between the cylinders on the opposite sides of the housing; handle receiving members formed on the opposite sides of the casing and arranged to support a pair of handles extending diametrically away from the worm gear structure; a worm shaft intermeshing with said worm gear and extending across the housing between the apex ends of the V-shaped cylinder structure; pistons in the cylinders having operating connections with the opposite ends of the worm shaft structure; a cover cap structure for the housing including the apex ends of the cylinder structures; said cover cap section being adapted to be joined to the housing in a plane coincident with the axis of the worm shaft; and bearings for the worm shaft having oppositely extending trunnions, the joining edges of the housing and the cover cap section being provided with registering seating recesses in which the trunnions of the bearings are received, whereby the removal of the cover cap section provides for the removal of the worm shaft structure as a unit.

ERNEST DUCHESNE.